UNITED STATES PATENT OFFICE.

PEARCE WILKS, OF DARTMOUTH, NOVA SCOTIA, CANADA.

PROCESS OF TREATING IRON.

No. 886,668.             Specification of Letters Patent.             Patented May 5, 1908.

Application filed July 16, 1906. Serial No. 326,449.

*To all whom it may concern:*

Be it known that I, PEARCE WILKS, a subject of the King of Great Britain, residing at Dartmouth, in the county of Halifax and Province of Nova Scotia, Canada, have invented certain new and useful Improvements in Processes of Treating Iron, of which the following is a specification.

My invention relates to an improved method for treating iron, and it consists in the steps and processes herein described and claimed.

An object of my invention is to provide an improved method of treating wrought iron or iron containing a small percentage of carbon, such as low-grade steel and soft cast iron, for removing impurities, such as carbon and sulfur.

My invention is especially adapted for improving the condition of iron which has become contaminated or crystallized, or otherwise deteriorated, by use.

My invention is further adapted for decreasing the amount of carbon in mild steels and low-grades of iron; where irons containing a slight percentage of carbon are treated, I find that all the carbon can be removed with a resultant production of pure wrought iron.

In the operation of my invention, iron in the form of "scrap" or sheets is packed with slaked lime in such manner as to cover its entire surfaces. When the scrap iron to be treated is in large and thick pieces, such pieces are broken, or worked, to reduce the thickness thereof. The iron thus packed in slaked lime is placed in a furnace and brought to a welding heat, which is generally recognized in the art as a temperature of approximately 2600° F.; such heat being maintained for a period depending upon the character and size of the iron under treatment. In this step of the process, care must be taken to prevent any material variation of the temperature from that of a welding heat, since any increase of the temperature will cause a rapid burning and deterioration of the iron, and a drop in the temperature will prevent a satisfactory combination of the impurities with the lime. My theory of the operation is that the impurities at the surface of the iron combine with the lime at a welding heat, and that the impurities in the interior of the iron are then diffused and absorbed by the purified surface portions, to be in turn removed by combination with the lime; these operations continuing until all of the impurities have been diffused, or driven, to the surface and combined with the lime. After the iron has been thus maintained at a welding heat in contact with the slaked lime, it is hammered, rolled, or otherwise suitably worked, to produce merchantable iron; and, during such working, the lime is expelled together with the impurities combined therewith.

I have obtained very satisfactory results by the use of approximately one pound of slaked lime to each one hundred pounds of metal under treatment, and this is my preferred proportion; but slight variations can be made in these proportions for varying characteristics in the iron under treatment.

I have described a preferred manner of carrying out my improved process, but obviously changes could be made within the spirit and scope of my invention.

Having thus described my invention, what I claim as new and desire to secure by Letters Patent is:—

1. The herein described process of purifying or decarburizing iron, which consists in subjecting a pile of sheet, or scrap, iron to a welding heat in contact with slaked lime for causing a combination of the surface impurities of the iron with such lime, maintaining the iron at a welding heat in contact with slaked lime for a sufficient period to cause a progressive diffusion of the impurities from the interior of the iron to the previously purified surface thereof and a subsequent combination of the impurities with the lime in contact with the surface of the iron, and working the purified pile at a welding temperature to expel the lime and the impurities combined therewith.

2. The herein described process of purifying or decarburizing iron, which consists in subjecting a pile of sheet, or scrap, iron to a temperature of substantially 2600° F. in contact with slaked lime, maintaining the iron and lime at such temperature for a sufficient period to cause diffusion of the impurities to the surface of the iron and their subsequent absorption by the lime, and working such heated pile to expel the lime together with the impurities combined therewith.

In testimony whereof I affix my signature in the presence of two witnesses.

PEARCE WILKS.

Witnesses:
   THOS. I. NOTTING,
   M. W. EAGAR.